(12) United States Patent
Hurrlein et al.

(10) Patent No.: US 7,017,892 B2
(45) Date of Patent: Mar. 28, 2006

(54) SUSPENSION STRUT WITH STOP BUFFER

(75) Inventors: Michael Hurrlein, deceased, late of Hammelburg (DE); by Gabriela Hurrlein, legal representative, Hammelburg (DE); Manfred Schuler, Dittelbrunn (DE); Alexander Miller, Würzburg (DE); Klaus Stretz, Hassfurt (DE)

(73) Assignee: ZF Sachs AG, Schweinfurt (DE)

( * ) Notice: Subject to any disclaimer, the term of this patent is extended or adjusted under 35 U.S.C. 154(b) by 10 days.

(21) Appl. No.: 10/229,410

(22) Filed: Aug. 28, 2002

(65) Prior Publication Data

US 2003/0047897 A1 Mar. 13, 2003

(30) Foreign Application Priority Data

Sep. 8, 2001 (DE) ......................... 101 44 164

(51) Int. Cl.
  *B60G 15/00* (2006.01)

(52) U.S. Cl. ................................. 267/220; 280/124.155

(58) Field of Classification Search ................. 267/220, 267/33, 219; 280/124.155, 124.154
See application file for complete search history.

(56) References Cited

U.S. PATENT DOCUMENTS 4,175,771 A 11/1979 Muzechuk et al.
4,681,304 A 7/1987 Hassan
4,934,730 A * 6/1990 Okuzumi ..................... 267/220
5,678,844 A 10/1997 Dassler et al.
6,082,749 A * 7/2000 Smith et al. ................. 207/220
6,296,396 B1 10/2001 Schwarzbich
6,592,112 B1 * 7/2003 Bishop et al. ............... 267/220

FOREIGN PATENT DOCUMENTS

| DE | 83 11 927 | 9/1983 |
|----|-----------|--------|
| DE | 35 32 681 | 3/1987 |
| GB | 2 158 549 | 11/1985 |
| JP | 07 012169 | 1/1995 |
| JP | 08 285002 | 11/1996 |

* cited by examiner

*Primary Examiner*—Matthew C. Graham
(74) *Attorney, Agent, or Firm*—Cohen, Pontani, Lieberman & Pavane

(57) ABSTRACT

A suspension strut including a piston rod extending from a cylinder, a connection bearing for connecting the piston rod to a vehicle body, a spring loading the cylinder away from the connection bearing, and a spring plate supporting the spring axially with respect to the connection bearing. A first bearing enables relative rotational movement between the spring plate and the connection bearing, and a second bearing enables relative rotational movement between the connection bearing and a stop buffer arranged between the connection bearing and the cylinder.

11 Claims, 1 Drawing Sheet

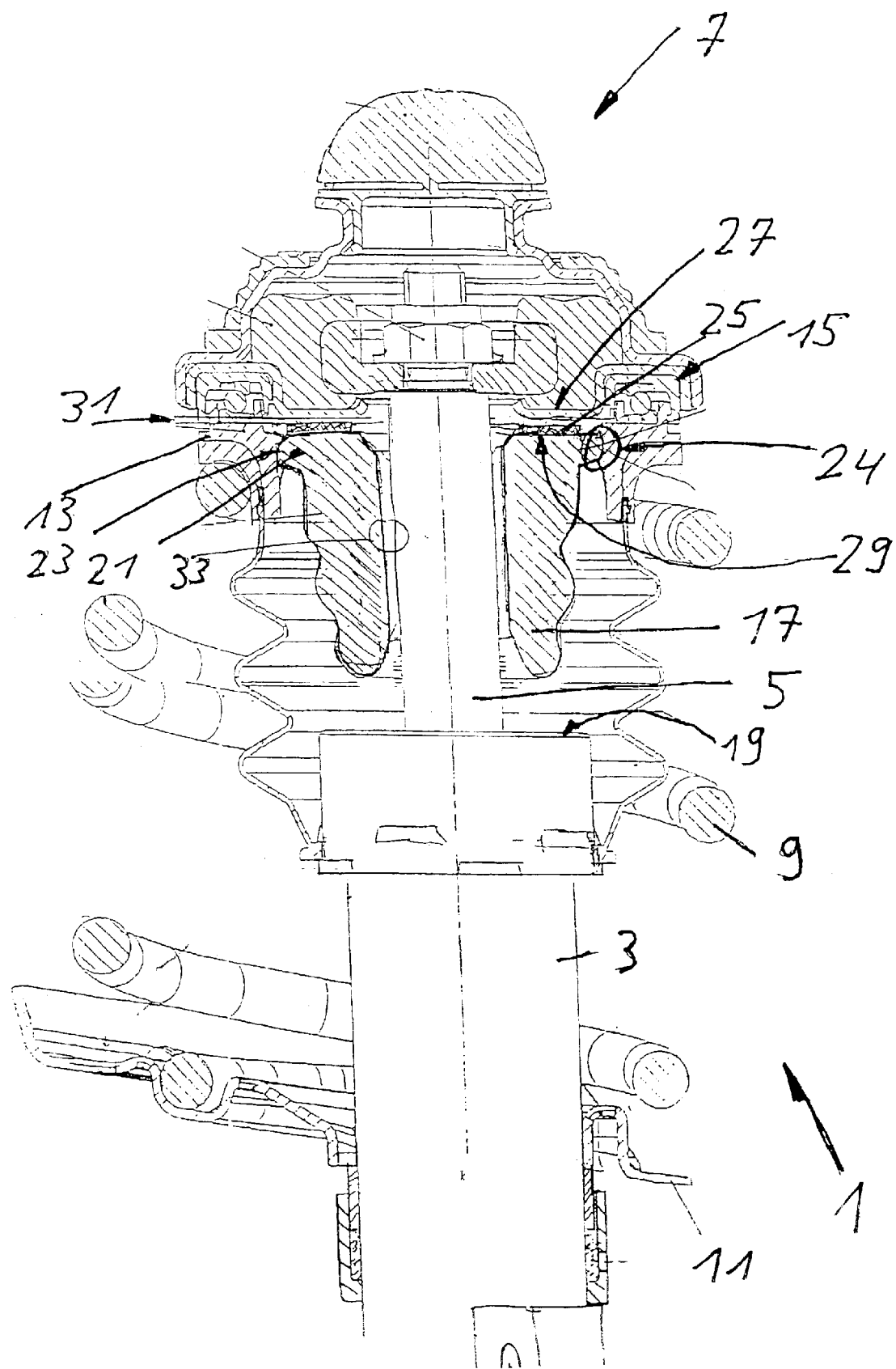

SUSPENSION STRUT WITH STOP BUFFER

BACKGROUND OF THE INVENTION

1. Field of the Invention

The invention is directed to a suspension strut with a bump stop or stop buffer according to the preamble of patent claim 1.

2. Description of the Related Art

DE 83 11 927 U1 discloses a suspension strut with a rotatable buffer support. In addition to a bearing between a spring plate and a connection member on the vehicle body side, a second bearing is used which compensates a relative movement between the connection member and the cylinder of the suspension strut if the stop buffer rests on the upper end face of the cylinder. The bearing is a component part of an end cap which is pressed onto the cylinder. The two bearings make it possible to completely decouple the connection bearing from the cylinder of the suspension strut. This excludes the occurrence of any tension between the connection bearing and the cylinder which would result in reduced comfort of the passengers of the vehicle.

SUMMARY OF THE INVENTION

While the end cap itself is constructed in a comparatively simple manner, it definitely represents a cost which is worth minimizing in accordance with the stated object of the invention.

According to the invention, this object is met in that the second bearing is functionally arranged between the stop buffer and the connection bearing.

The essential advantage of this bearing arrangement is that an end cap can be dispensed with or a simpler construction can be used for the structural shape of a rigid end cap. Further, the second bearing is advantageously constructed as a sliding bearing.

In principle, there are two possibilities for fastening the second bearing. First, the second bearing can be supported by the stop buffer. Alternatively, the second bearing can also be fastened to the connection bearing. The decision depends extensively on the construction of the two supporting components. Accordingly, the connection bearing frequently has a carrier plate for receiving axial forces from the stop buffer. When the second bearing is fastened to the carrier plate as well, a solid basis results and a long service life of the bearing is achieved. The extensive freedom of form of the material of the stop buffer favors the arrangement of the second bearing at the stop buffer.

Further, it is provided that the stop buffer is held by the spring plate. Accordingly, the load on the stop buffer is distributed partly to the spring plate and partly to the connection bearing. In addition, there is a definite spatial relationship between the spring plate, the second bearing and the connection bearing; taken together, the assembly of these components is very simple.

In order to uniquely define the position of the stop buffer, the latter is locked axially with the spring plate.

For purposes of a bearing which is as simple and economical as possible, there is free travel between the second bearing and the connection bearing which is overcome after a determined spring force of the stop buffer has been reached. With lower forces on the stop buffer, the force is conducted to the spring plate and received by the connection bearing. The second bearing does not yet take effect. The second bearing starts to function only when greater forces exist, although the latter are partially absorbed by the locking between the spring plate and stop buffer; consequently, the second bearing is subject to appreciably reduced stress with respect to service life as though there were permanent contact with the connection bearing.

In order to prevent extraneous friction, the stop buffer has a radial distance from the piston rod. Insofar as it seems necessary, areas can be provided between the stop buffer and the piston rod that are covered by special sliding means and accordingly also generate only minimal extraneous friction at contact.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The sole FIGURE is a partial section view of a suspension strut according to the invention.

DETAILED DESCRIPTION OF THE PRESENTLY PREFERRED EMBODIMENTS

The drawing shows the upper end of a suspension strut 1, a piston rod 5 being arranged in its cylinder 3 so as to be movable axially. The outside end of the piston rod is connected to a vehicle body, not shown, via a connection bearing 7. A vehicle spring 9 encloses the piston rod; a lower spring plate 11 at the cylinder and an upper spring plate 13 at the connection bearing keep the vehicle spring constantly pretensioned. The vehicle spring can also be constructed as an air spring and is not limited only to applications within a chassis, but can also support other oscillating masses, e.g., a driver's cab, in a springing manner. A first bearing 15 is arranged between the upper spring plate 13 and the connection bearing 7. This first bearing 15 permits a rotational movement of the spring plate 13 relative to the connection bearing 7 and accordingly prevents tension between the cylinder and connection bearing as the force continues along the vehicle spring to the upper spring plate.

A stop buffer 17 is arranged inside the annular space between the vehicle spring and the piston rod. After the piston rod moves in by a defined distance, the stop buffer 17 stops on and is supported at an end face 19 of the cylinder. The stop buffer has a circumferential edge 21 which engages in a bead 23 of the upper spring plate 13 and accordingly is axially fixed to the spring plate at area 24. A second bearing 25 having the structural shape of a sliding-bearing disk is arranged between the upper end of the stop buffer 17 and the connection bearing 7. In principle, it is possible and occasionally sensible to arrange and fasten the sliding-bearing disk at a preferably rigid structural component part of the connection bearing, particularly the carrier plate 27 or an end face 29 of the stop buffer. Preferably, however, there is free axial travel 31 between the second bearing 25 and a supporting face at the connection bearing 7, which in this case is provided by the carrier plate 27. The second bearing 25 is therefore rotatable with respect to the connection bearing. Up to a definable load limit, the lock 24 ensures that all of the force introduced is guided via the upper spring plate into the connection bearing. Accordingly, the second bearing 25 is functionally bypassed. The stop buffer 17 is deformed beyond the above-mentioned load limit until there is contact between the connection bearing and the stop buffer via the second bearing. Consequently, the second bearing can be designed for a relatively smaller force, since it is comparatively rare that the second bearing is loaded to the limit.

The stop buffer has a radial distance 33 from the piston rod so that the functioning of the second bearing is not impaired. This ensures a complete decoupling of the connection bearing from the cylinder when the stop buffer is supported at the cylinder.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A suspension strut comprising
   a cylinder,
   a piston rod extending from said cylinder,
   a connection bearing for connecting said piston rod to a vehicle body,
   a spring loading said cylinder away from said connection bearing,
   a spring plate supporting said spring axially with respect to said connection bearing,
   a first bearing which enables relative rotational movement between said spring plate and said connection bearing,
   a stop buffer between said connection bearing and said cylinder, wherein said stop buffer is fixed to said spring plate, and
   a second bearing which enables relative rotational movement between said stop buffer and said connection bearing.

2. A suspension strut as in claim 1 wherein said second bearing is a slide bearing.

3. A suspension strut as in claim 1 wherein said second bearing is supported by said stop buffer.

4. A suspension strut as in claim 1 wherein said second bearing is supported by said connection bearing.

5. A suspension strut as in claim 1 wherein said second bearing travels toward said connection bearing under a predetermined force exerted by the stop buffer.

6. A suspension strut as in claim 1 wherein said stop buffer is radially spaced from said piston rod.

7. A suspension strut as in claim 1 wherein said stop buffer deforms to contact said connection bearing via said second bearing when said stop buffer is subjected to a predetermined axial force by said cylinder.

8. A suspension strut as in claim 7 wherein said second bearing is axially spaced from said connection bearing until said stop buffer is subjected to said predetermined axial force.

9. A suspension strut as in claim 1 wherein said second bearing is rotatable with respect to said connection bearing.

10. A suspension strut as in claim 1 wherein said stop buffer has a circumferential edge which is fixed to said spring plate.

11. A suspension strut as in claim 1 wherein said spring plate has a bead, said circumferential edge engaging in said bead.

\* \* \* \* \*